UNITED STATES PATENT OFFICE.

WILLIAM MORRISON, OF CHICAGO, ILLINOIS.

PROCESS OF MAKING STORAGE-BATTERY ELECTRODES AND FILLING MASS THEREFOR.

1,284,426.

Specification of Letters Patent.

Patented Nov. 12, 1918.

No Drawing.

Application filed February 23, 1918. Serial No. 218,732.

*To all whom it may concern:*

Be it known that I, WILLIAM MORRISON, a citizen of the United States, residing at Chicago, in the county of Cook and State of Illinois, have invented certain new and useful Improvements in Processes of Making Storage-Battery Electrodes and Filling Mass Therefor, of which the following is a specification.

This invention relates to lead storage battery electrodes of the pasted-grid type, and comprises a novel process applicable for the production of both negative and positive plates. The invention comprises also a novel filling-mass for such electrodes. It is characteristic of storage battery electrodes prepared as hereinafter described that they may be subjected to one or several reversals in the course of which they are completely discharged and fully re-charged with reversed polarity, and that this may be done not merely without injury to the plate, but such reversals add materially to the capacity of the electrode.

The preparation of the plate will now be described by reference to a preferred procedure, it being understood, however, that my invention is not restricted to the particular proportions of materials or concentrations of acid set forth by way of example; nor is my invention limited to the performance of all of the manipulations and steps which constitute my preferred procedure, which is as follows:

I first prepare an acid reagent containing sulfuric acid diluted with about 10% or more by volume of commercial (3%) hydrogen peroxid solution, the proportion of acid being such that the specific gravity of the mixture is approximately 1325 (water 1000). To about 4.5 gallons of this acid liquid contained in a stoneware or other suitable vessel, I add with stirring about 118 lbs. of a mixture which may comprise approximately three parts of litharge (PbO) and one part of red lead ($Pb_3O_4$). In the course of this operation, when properly conducted, a strong evolution of heat and a progressive thickening of the mixture are observed, accompanied by bubbling of the mass and abundant evolution of gas (oxygen) and steam. In a typical operation the temperature rises to or above the boiling point of water, the precise temperature reached being dependent among other factors, upon the scale of operations, and the rate of addition of the lead oxid.

As soon as the initial energetic reaction has subsided, the still moist mass or heavy paste is preferably packed into suitable containers and permitted to cool slowly, say for 24 hours, during which period the reaction proceeds to completion. At the end of this time the product is a rather friable, reddish-brown solid, which should be quite free from uncombined acid. This product is substantially stable, by which I mean that it does not exhibit any substantial or material tendency to spontaneous setting or hardening when stored in bulk, unless subjected to sufficient pressure to initiate such setting, as described below.

The function of the hydrogen peroxid, which as is known is capable when in acid solution of acting as a reducing agent, is to effect the reduction to a lower oxid of lead of the peroxid component of the red lead, which latter may be regarded as a compound or mixture represented by the formula $2PbO.PbO_2$. At the conclusion of this stage of the process the mass should preferably leave little or no residue of peroxid when treated with dilute nitric acid. The presence of any considerable residue of lead peroxid when so treated indicates an insufficiency of hydrogen peroxid in the acid mixture. I may use an oxid mixture containing either more or less red lead than specified above, the proportion of the reducing agent, as hydrogen peroxid, being preferably appropriately altered. As above stated, the properly prepared filling-mass may be kept in bulk for long periods without becoming hard and unworkable.

The rather friable, acid-free filling-mass prepared as above is now preferably rubbed or worked under the spatula or by any appropriate mechanism until it becomes plastic and somewhat putty-like in consistence. In this state it is pasted and closely packed into the grids, the precaution being taken to so completely fill the grids that in the subsequent pressing step a sufficient pressure will be exerted upon the filling.

The pasted-grids are subjected, preferably between absorbent pads, such as blotting paper, to a short or even momentary high pressure in a hydraulic or other press, a pressure approximating one ton or somewhat less per square inch of surface being satisfactory in practice. The pressed plates are then preferably closely packed in order that they may retain for a reasonable period their residual moisture and to prevent a too rapid and hard setting of the filling-mass, which should retain a definite although relatively slight degree of plasticity or softness until it is submitted to the electrical forming process. As heretofore stated, the effect of the pressure to which the filling-mass is subjected is to initiate the setting or hardening thereof.

The plates are now assembled into groups, alternately positively and negatively connected, with suitable separators or spacing devices, as for example ribbed and perforated hard rubber sheets. The assembled plates are preferably immersed in water for a few minutes, or until the interstices or pores of the filling-mass are completely filled. The plates are then formed by immersing the group in an acid electrolyte, for example, sulfuric acid of specific gravity 1025, and passing the current until the positive plates are fully oxidized and the negative plates fully reduced. The plates are then preferably permitted to discharge to an extent at least equal to their rated capacity, before removing them from the electrolyte. The preparation of the electrodes may now be regarded as complete, although as above stated, the battery may be completely discharged and re-charged with reversed polarity, this reversal being repeated several times if desired and resulting in a material increase in the capacity of the electrodes.

In explanation of the purpose of saturating the plates with water immediately before the electrical forming process, it is pointed out that the proportion of sulfuric acid to the oxids of lead in the original mixture is insufficient to yield the white sulfate of lead under the described operating conditions, although sufficient to provide, in the filling-mass, a materially larger proportion of the sulfate radical than could be taken up by the active material in any subsequent running down of the battery under conditions of use. A further treatment of the dry filling-mass with sulfuric acid would, however, tend to the formation of such white sulfate, the elimination of which can only be accomplished by a relatively large expenditure of current during the operation of forming. The effect of the dipping or saturating treatment is to fill the pores of the plates with water, which so far prevents access of the sulfuric acid electrolyte to the interior of the plates that the formation of sulfate is avoided and the forming process is accomplished relatively quickly and with comparatively small expenditure of current. The introduction of sulfuric acid into the interior of the plate is further minimized by the use of relatively dilute acid (1025 specific gravity) for the forming electrolyte, this electrolyte, of course, increasing in gravity during the forming process as the sulfuric acid radical is eliminated from the active material. In other words, during the forming process, the liquid within the active mass is of materially lower concentration and therefore of lower electrical conductivity than the external electrolyte. It results from this condition that the formation of the plate (oxidation or reduction) starts in the main at the external areas in contact with the grid, and extends progressively throughout the mass of active material. I have found that under these conditions the reduction may be accomplished with much greater rapidity. It will be understood, however, that plates prepared as hereindescribed may be electrically formed directly in sulfuric acid without previous immersion in water, especially if the plates have not been permitted to dry out too far, although as above pointed out this requires a materially greater expenditure both of time and current whenever the conditions are such that sulfating sets in.

My invention is not limited to the use of hydrogen peroxid as a reducing agent for the higher oxids of lead, inasmuch as other reducing agents, including oxalic acid, formaldehyde, metallic peroxids, etc., are capable of producing somewhat similar results. I prefer, however, to use hydrogen peroxid for reduction purposes, inasmuch as it yields no reaction product of an objectionable or difficultly removable nature.

A principal object of using a certain proportion of red lead in conjuction with litharge is to improve the texture of the filling-mass. This is not necessary, however, in every case, inasmuch as there exist commercial grades of litharge which are capable of yielding, under the conditions of my process, a satisfactory commercial plate. Commercial litharge often contains, however, considerable proportions of lead peroxid, the presence of which in the filling-mass is to be avoided, and therefore even when the red lead is omitted I prefer to use sufficient peroxid of hydrogen to produce a substantially peroxid-free filling-mass, as indicated above. In case a litharge substantially free from peroxid of lead and unmixed with red lead were used, the reducing agent may, of course, be omitted without departing from my invention.

I claim:—
1. The hereindescribed process of preparing a storage battery electrode, comprising commingling sulfuric acid and litharge under conditions to initiate an energetic re- action and to produce a non-acid, stable filling-mass; transferring the filling-mass to a grid or support and subjecting it therein to sufficient pressure to initiate the setting or hardening of the mass, and electrically forming the plate.

2. The hereindescribed process of preparing a storage battery electrode, comprising commingling sulfuric acid and litharge under conditions to initiate an energetic reaction and to produce a non-acid, stable filling-mass; transferring the filling-mass to a grid or support and subjecting it therein to sufficient pressure to initiate the setting or hardening of the mass, and electrically forming the plate before the filling-mass has attained its maximum hardness or set.

3. The hereindescribed process of preparing a storage battery electrode, comprising commingling sulfuric acid and litharge under conditions to initiate an energetic reaction and to produce a non-acid, stable filling-mass; transferring the filling-mass to a grid or support and subjecting it therein to sufficient pressure to initiate the setting or hardening of the mass, saturating the plate with water, and electrically forming the plate in sulfuric acid solution.

4. The hereindescribed process of preparing a storage battery electrode, comprising commingling sulfuric acid and litharge under conditions to initiate an energetic reaction and to produce a non-acid, stable filling-mass; transferring the filling-mass to a grid or support and subjecting it therein to sufficient pressure to initiate the setting or hardening of the mass, saturating the plate with water before the filling-mass has attained its maximum hardness or set, and electrically forming the plate in sulfuric acid solution.

5. The hereindescribed process of preparing a storage battery electrode, comprising commingling sulfuric acid, lower and higher oxids of lead, and a substance capable of reducing said higher oxid, under conditions to initiate an energetic reation; transferring the resulting filling-mass to a grid or support and pressing it therein, and electrically forming the plate.

6. The hereindescribed process of preparing a storage battery electrode, comprising commingling sulfuric acid, lower and higher oxids of lead, and hydrogen peroxid, under conditions to initiate an energetic reaction; transferring the resulting filling-mass to a grid or support and subjecting it therein to sufficient pressure to initiate the setting or hardening of the mass, and electrically forming the plate before the filling-mass has attained its maximum hardness or set.

7. The hereindescribed process of preparing a storage battery electrode, comprising commingling sulfuric acid, a mixture of litharge and red lead, and a substance capable of reducing the perioxid component of the red lead, under conditions to initiate an energetic reaction; transferring the resulting filling-mass to a grid or support and pressing it therein, and electrically forming the plate.

8. The hereindescribed process of preparing a storage battery electrode, comprising commingling sulfuric acid, a mixture of litharge and red lead, and hydrogen peroxid, under conditions to initiate an energetic reaction, transferring the resulting filling-mass to a grid or support and pressing it therein, and electrically forming the plate.

9. In a process of preparing a storage battery electrode, the step of producing a filling-mass which comprises commingling sulfuric acid and litharge under conditions to initiate an energetic reaction, and continuing the reaction until a solid, somewhat friable, and substantially stable reaction product is formed.

10. In a process of preparing a storage battery electrode, the step of producing a filling-mass which comprises commingling sulfuric acid, lower and higher oxids of lead, and a substance capable of reducing said higher oxid, under conditions to initiate an energetic reaction, and continuing the reaction until a solid, somewhat friable, and substantially stable reaction product is formed.

11. In a process of preparing a storage battery electrode, the step of producing a filling-mass, which comprises commingling sulfuric acid, lower and higher oxids of lead, and hydrogen peroxid, under conditions to initiate an energetic reaction, and continuing the reaction until a solid, somewhat friable, and substantially stable reaction product is formed.

12. As a new article of manufacture, the hereindescribed filling-mass for lead storage batteries, characterized by its substantial stability or freedom from tendency to spontaneous setting or hardening, but capable of hardening rapidly after subjection to sufficient pressure.

13. As a new article of manufucture, the hereindescribed filling-mass for lead storage batteries, said mass resulting from reaction of sulfuric acid upon lower and higher oxids of lead in presence of a substance capable of reducing said higher oxid, characterized by its substantial stability or freedom from tendency to spontaneous setting or hardening, but capable of hardening rapidly after subjection to sufficient pressure.

14. As a new article of manufacture, the hereindescribed filling-mass for lead storage batteries, said mass resulting from reaction of sulfuric acid upon lower and higher oxids of lead in presence of hydrogen peroxid, characterized by its substantial stability or freedom from tendency to spontane- 15. In a process of preparing a storage battery electrode, the step of producing a filling-mass which consists in commingling sulfuric acid and litharge under conditions to initiate an energetic reaction with strong evolution of heat, and completing the reaction at a lower temperature, whereby a substantially acid-free, stable filling-mass is produced.

16. In a process of preparing a storage battery electrode, the step of producing a filling-mass which consists in commingling sulfuric acid, lower and higher oxids of lead, and a substance capable of reducing said higher oxid, under conditions to initiate an energetic reaction with strong evolution of heat, and completing the reaction at a lower temperature, whereby a substantially acid-free, stable filling-mass is produced.

17. The hereindescribed process of preparing a storage battery electrode, comprising commingling sulfuric acid, lower and higher oxids of lead, and a substance capable of reducing said higher oxid, transferring the resulting filling-mass to a grid or plate and pressing it therein, saturating the plate with water, and electrically forming the plate in a sulfuric acid solution.

18. In a process of preparing a storage battery electrode, the step which consists in saturating the filling-mass with an aqueous liquid of relatively low electrical conductivity, and then forming the plate in an electrolyte of higher conductivity.

19. In a process of preparing a storage battery electrode, the step which consists in saturating the filling-mass with water and then forming the plate in a sulfuric acid electrolyte.

20. In a process of preparing a lead storage battery electrode of the pasted-grid type, the method of increasing the capacity of the plate which consists in electrically forming the plate, completely discharging the same, and reforming with reversed polarity.

21. In a process of preparing a lead storage battery electrode of the pasted-grid type, the method of increasing the capacity of the plate which consists in electrically forming the plate, completely discharging the same and reforming with reversed polarity, and repeating the operation until the desired capacity is attained.

22. The hereindescribed process of preparing a storage battery electrode comprising commingling sulfuric acid and oxid of lead, and continuing the reaction until a solid, somewhat friable, and substantially stable reaction product is formed, the reacting materials being used in such proportion that the reaction product contains a larger proportion of the sulfate radical than can be taken up by the active material in the discharge of the battery.

23. There hereindescribed process of preparing a storage battery electrode comprising commingling sulfuric acid and lower and higher oxids of lead and a substance capable of reducing said higher oxid, and continuing the reaction until a solid, somewhat friable, and substantially stable reaction product is formed, the reacting materials being used in such proportion that the reaction product contains a larger proportion of the sulfate radical than can be taken up by the active material in the discharge of the battery.

24. As a new article of manufacture, the hereindescribed filling mass for lead storage batteries, said mass resulting from the reaction of sulfuric acid upon oxid of lead, and characterized by containing a materially larger proportion of the sulfate radical than can be taken up by the active material in the discharge of the battery.

In testimony whereof I affix my signature.

WILLIAM MORRISON.

Copies of this patent may be obtained for five cents each, by addressing the "Commissioner of Patents, Washington, D. C."